Feb. 4, 1930.  J. KOVATS  1,745,998
CARD TABLE
Filed Jan. 12, 1929   2 Sheets-Sheet 1

Inventor
John Kovats
By Wooster & Davis
Attorneys.

Feb. 4, 1930.    J. KOVATS    1,745,998
CARD TABLE
Filed Jan. 12, 1929    2 Sheets-Sheet 2
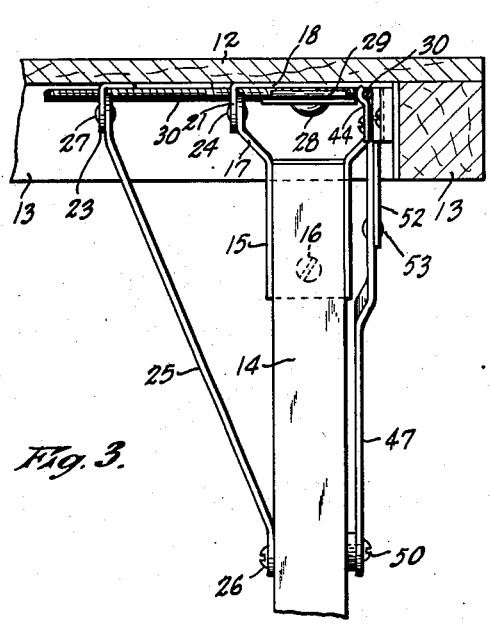
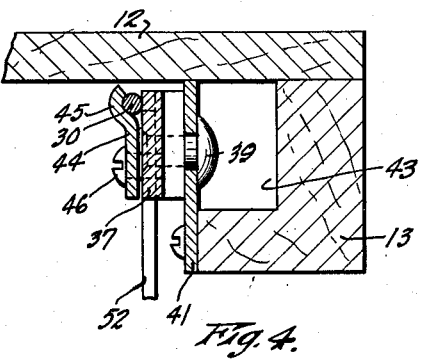
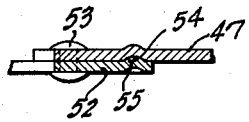
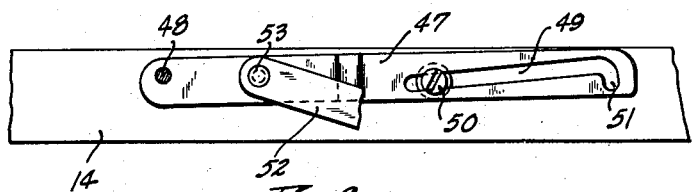
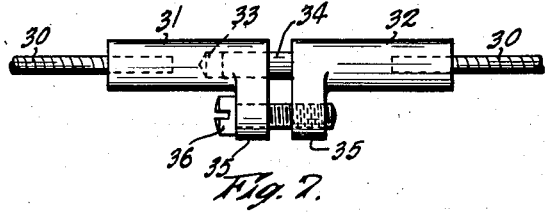
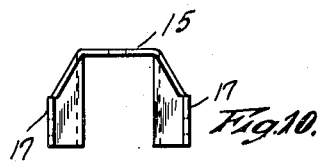
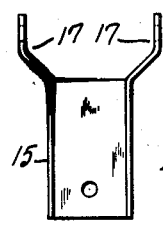
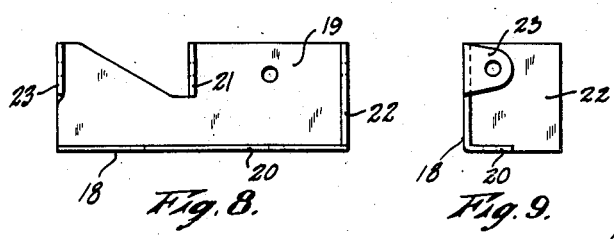
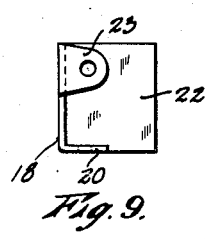
Inventor
John Kovats
By Wooster & Davis
Attorneys Patented Feb. 4, 1930

1,745,998

UNITED STATES PATENT OFFICE

JOHN KOVATS, OF BRIDGEPORT, CONNECTICUT, ASSIGNOR TO LORRAINE METAL MANUFACTURING COMPANY, OF BRIDGEPORT, CONNECTICUT, A CORPORATION OF NEW YORK

CARD TABLE

Application filed January 12, 1929. Serial No. 332,070.

This invention relates to a table, particularly to a means for mounting the supporting legs of the table, and has for an object to provide means for so connecting the supporting legs to the table that they may all be folded against the under side of this table, and are connected by mechanism so that the swinging of any leg to or from the extended or supporting position will impart a similar movement to each of the other legs.

It is also an object of the invention to provide a construction in which there is an individual locking means for each leg which is so connected with the locking mechanism for each of the other legs that they will all automatically lock when the legs are swung to the supporting position, and the release of any one locking means will release all the other locking means to permit the legs to be swung to folded position.

It is another object of the invention to provide a construction in which, although all the legs may be swung to or from the extended or folded position by swinging any individual leg on its pivot, still the legs are rigidly held in the supporting position to provide a rigid support for the table.

It is still another object of the invention to provide a construction of this character in which practically the entire structure may be stamped from sheet metal and may be manufactured and assembled at relatively low cost. With the foregoing and other objects in view, the invention consists in certain novel features of construction, combinations and arrangements of parts as will be more fully disclosed in connection with the accompanying drawings. In these drawings, Fig. 1 is a bottom plan view of a table showing the legs folded against the under side thereof.

Fig. 3 is a similar section taken at right angles to Fig. 2.

Fig. 4 is a detail section substantially on line 4—4 of Fig. 2.

Fig. 5 is a detail section substantially on line 5—5 of Fig. 2.

Fig. 6 is a side elevation of a portion of the operating and locking means for a leg.

Fig. 7 is a side elevation of the adjusting clamp for the cable.

Fig. 8 is a plan view of the bracket for mounting the individual legs.

Fig. 9 is an end view thereof.

Fig. 10 is an end view of the holder used in mounting the individual legs in the bracket, and Fig. 11 is a side view thereof.

Figure 1:
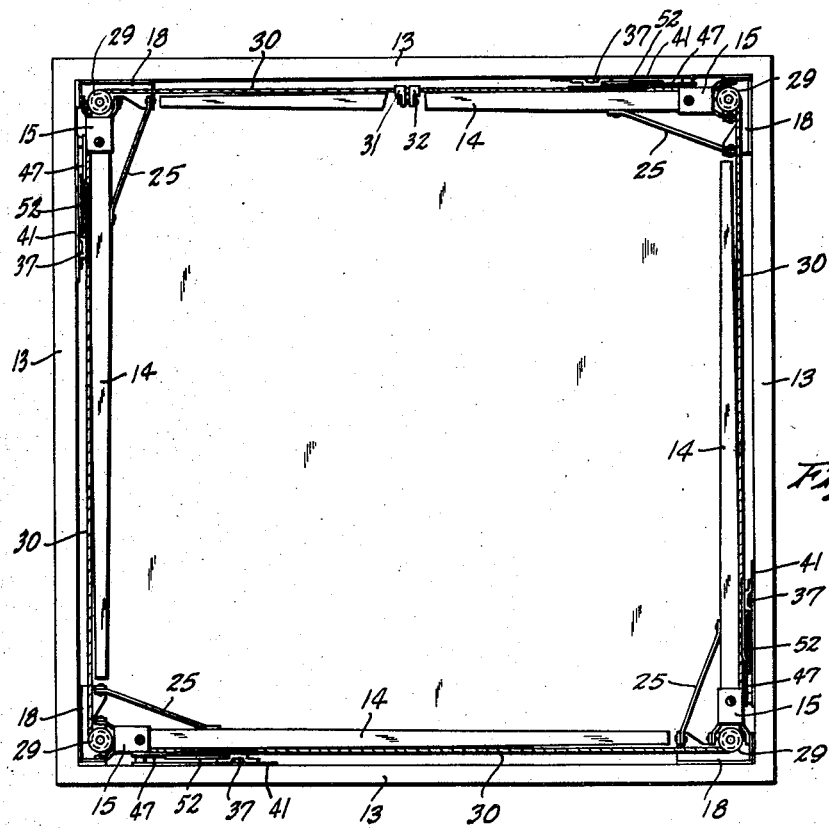

This device is adapted for tables of various types but is especially intended for use on what are commonly known as card tables in which the legs are foldable against the under side of the table top, so that the table may be folded into a small space and put away into a closet or other suitable space when not in use, and the device is, therefore, shown in the drawings as applied to this type of table. The table top is shown at 12 which, of course, may be of any suitable material and may be finished on the top or covered with any suitable cover as is found desirable. Secured to the under side of this top of the table and extending about the periphery thereof are usually mounted wooden bars 13 which strengthen and stiffen the table top and assist in preventing warping. The table shown is a substantially square or rectangular table and is, therefore, provided with a supporting leg 14 at each corner. These legs are each pivoted to the table so as to fold or swing against the under side thereof and they are all mounted in the same manner. They thus each swing in the same direction in relation to the periphery of the table from their individual corners and lie substantially parallel with the bar or flange 13 when they are folded against the under side of the table top. As the means for mounting each is the same as that for mounting each of the other legs one set of dies may be used for making all the mountings and they are, therefore, each interchangeable, and I will describe but one of them.

The legs 14 shown are substantially square in cross section but, of course, may be of any shape desired. Its upper end is secured in a holder 15 which is made of sheet metal and is substantially U-shape in cross section to receive the upper end of the leg, and therefore, embraces it on three sides, and it is preferably secured thereto by a bolt or screw 16. Projecting from the end of the leg this holder is provided with a pair of spaced ears 17 which form continuations of the side walls of the holder. The leg is mounted by pivoting these ears in a bracket 18 which is mounted on the under side of the table. This bracket is also made of metal of suitable gauge and has a base portion 19 which is secured to the under side of the table top by any suitable means, such as screws or bolts, and it has a side flange 20 which may be secured to the inside of the bar 13 to provide a very rigid construction. The base portion is cut and bent upwardly to form an ear 21 and the opposite ends are also bent upwardly to provide ears 22 and 23 spaced from and on opposite sides of the ear 21. The ears 17 of the leg holder 15 are pivoted to the ears 21 and 22 by means of suitable pins or rivets 24, and a brace 25 is secured at one end at 26 to the side of the leg 14 and at its opposite end, as shown at 27, is pivoted to the ear 23 in alignment with the pivots 24. This brace 25, therefore, braces the leg and holds it rigid against movement laterally in the plane of the pivots.

Mounted on each bracket 19 on a suitable stud 28 is a grooved pulley 29. There is, therefore, one of these pulleys at each corner of the table, and there is a flexible member 30 which runs over these pulleys or rollers. This flexible member is preferably in the form of a wire cable as that has been found to be very satisfactory, and the free ends of this cable are connected by suitable connecting means so that when mounted the cable is a substantially continuous element. The clamping or connecting means for the ends of the cable, as shown in the drawing, comprises a member 31 connected to one end of the cable and a member 32 connected to the other end of the cable. Member 31 has a socket 33 in its end to receive a guiding stud 34 projecting from the end of the member 32, and each member has a lateral lug 35 for a screw 36 which is threaded into one of these lugs. Therefore, by manipulating the screw 36 the tension on the cable may be adjusted and made as tight as is found desirable. For satisfactory operation the tension on the cable should be sufficient to keep it taut.

Adjacent each corner of the table there is a clamp secured to the cable. The clamp shown in the drawings comprises a block 37 which carries a pair of headed studs 38 and 39 passing through an elongated slot 40 in a guide plate 41 secured by any suitable means, such as screws 42, to the inside of the bar 13, as shown more clearly in Figs. 2 and 4, and it is preferred to recess the bar 13 behind this plate, as shown at 43, Fig. 4, to provide clearance for the heads of the studs 38 and 39. The slot 40 and studs 38 and 39, therefore, guide the block 37 for longitudinal reciprocating movement on the plate 41. The block is secured to the cable 30 by means of a clamping plate 44. This plate is curved at one side, as shown at 45, to provide a groove to receive the cable 30 and the cable is clamped in this groove against the surface of the block 37 by suitable clamping screws 46. The block, therefore, may be adjusted to the proper position on the cable 30 and then securely clamped thereto so as to move with it by means of the screws 46.

A strap or brace 47 is pivoted to the plate 41 at 48 and has an elongated slot 49 extending longitudinally thereof adjacent its free end in which runs a stud or pin 50 carried by the leg 14, and the slot 49 is provided at its free end with a lateral extension or notch 51 to receive this stud or pin 50 when the leg is swung to the upright or supporting position to thus lock the leg in this position. A link 52 is pivoted to the block 37, preferably by means of the stud 39, and at its opposite end is pivoted to the strap or brace 47 at 53 laterally to one side or that is spaced from the pivot 48. As indicated above, each of the four legs is mounted in the same manner and each is connected to the cable 30 by means of the clamping block 37, link 52 and the strap or brace 47.

In describing the operation I will assume the legs are folded against the bottom of the table, as shown in Fig. 1. If now the operator swings any one of the legs 14 about its pivot to a position at right angles to the table top, or that is to the supporting position, this action will swing the strap or brace 47 about its pivot 48 to the position shown in full lines, Fig. 2, it being, of course, understood that when the leg is folded against the table this strap 47 also lies substantially parallel with the table top to the inner side of the plate 41 and also along one side of the leg of the table, as shown in Fig. 6. When, however, the leg is swung to the upright position of Fig. 2, the stud 50 will slide along the slot 49 and swing the strap 47 about its pivot 48, the movement being clockwise, as viewed in Fig. 2. This movement will also carry with it the link 52 and shift the clamp 37 to the left in the slot 40, or that is toward the pivot for the table leg. This movement of the clamp 37 will give a corresponding movement to the cable 30 as the clamp is rigidly secured thereto, and this movement of the cable 30 will, therefore, give a similar movement to each of the clamps 37 of the other three legs of the table. The movement of these latter clamps by acting through their links 52 will impart a similar swinging movement to their individual straps or braces 47 which, acting through their slots 49 and the studs 50, will swing all the other legs simultaneously about their pivots to the upright or supporting position. As the legs reach this position the push of the links 52 on the straps 47 will automatically shift the free ends of the straps 47 laterally to cause the studs 50 to seat in the notches 51. Therefore, each leg is automatically locked in this extended or supporting position, and the straps 47 are held in this locking position by a coacting recess 54 and struck up nub 55, Fig. 5, on the strap 47 and link 52 respectively.

Figure 2:
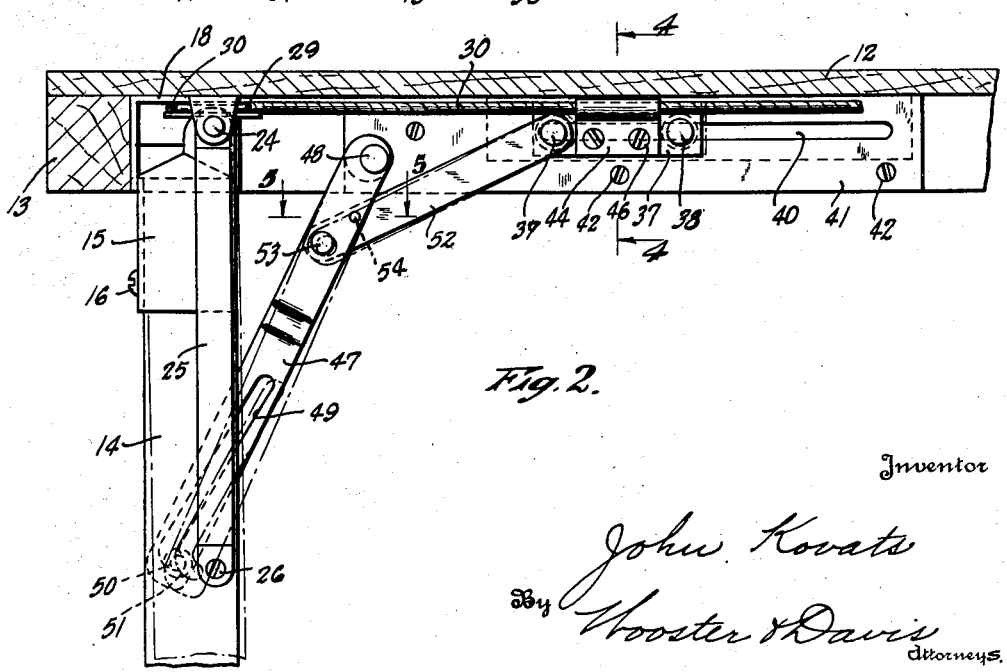
Fig. 2 is a vertical section through one side of the table on an enlarged scale showing the means for mounting the legs and showing the elements in the position they occupy when the leg is in the supporting or extended position.

It will be seen from Figs. 2 and 3, that the brace 25 embraces the leg in one direction or plane while the strap or brace 47 braces the leg in a direction or plane at right angles thereto, and therefore, the leg when in the upright or supporting position is braced in all directions, giving a very rigid construction and preventing wabbling of the table.

To collapse the legs or fold them against the under side of the table all that is necessary is for the operator to swing laterally the free end of one of the straps or braces 47, as shown in dot and dash lines, Fig. 2, so as to remove the notch 51 from the stud 50 and bring the stud 50 into alignment with the longitudinal section of the slot 49. This movement unlocks the particular leg involved and at the same time this movement of the strap 47 operating through its link 52 shifts the clamping block 37 a small amount. The movement of this block is transmitted to the cable 30 which transmits the same movement to each of the other straps 47, and therefore, the shifting of the free end of any one of the straps 47 to unlock the leg held thereby will simultaneously shift the straps or braces 47 of each of the other legs in a similar manner and unlock each one of these legs. Now all the operator has to do is to merely swing inwardly any one of the legs, usually the leg which he just unlocked, and the cable will simultaneouly swing all the other legs to the folded position. It will, therefore, be seen that with this construction the legs may all be simultaneously swung to the extended or supporting position and be automatically locked therein by the swinging of any one of these legs to this position. Also that the act of unlocking any leg will simultaneously unlock all the other legs and they are all swung simultaneously to the folded position by the single act of swinging one of the legs to this position. It will be noted also that practically all of the parts can be made of sheet metal, and that the construction is a very simple one which may be manufactured and assembled at relatively low cost.

Having thus set forth the nature of my invention, what I claim is:

1. In a table, a plurality of supporting legs pivoted to the table on individual pivots and each capable of folding against the under side of the table, a movable connection connected to each of the legs and capable of transmitting movement from any leg to each of the other legs to extend the legs to supporting position and to fold them against the table, and a separate locking means for each leg operated by said connection.

2. In a table, a plurality of supporting legs pivoted to the table on individual pivots arranged so that all the legs fold in the same direction with respect to the periphery of the table, guides secured to the table, a flexible cable passing over said guides, connections between the legs and the cable capable of transmitting similar movement from any leg to each of the other legs to extend the legs to supporting position or fold them against the table, and an individual locking means for each leg operated by said connections.

3. In a table, a plurality of supporting legs pivoted to the table and foldable against it, means connecting all of the legs so that operation of any leg on its pivot will impart similar movement to all the other legs, and a separate locking means for each leg operated by said connecting means.

4. In a table, a plurality of supporting legs pivoted to the table and foldable against it, means for connecting the legs with each other so that movement of any leg will give similar movement to the other legs, and means for locking each leg in supporting position, there being a locking means for each leg and so connected to the connecting means that release of one locking means functions said connection to release the other locking means.

5. In a table, a plurality of supporting legs pivoted to the table so as to fold against it, guides secured to the table, a continuous flexible member passing over said guides, connections from said member to the respective legs to swing them on their pivots by movement of said member, and individual locking means for the respective legs to lock them in supporting position and each connected to the flexible member for operation thereby.

6. In a table, a plurality of supporting legs pivoted to the table so as to fold against it, guides secured to the table, a continuous flexible member passing over said guides, a link connection from said member to each leg having an elongated slot with a notch in one side edge, and means on each leg slidable in the slot and adapted to seat in said notch to lock the leg in supporting position.

7. In a table, a plurality of supporting legs pivoted to the table so as to fold against it, a roller guide secured to the table adjacent each leg, a continuous flexible cable passing over the guides, a brace pivoted to the table adjacent each leg and each having sliding connection with the adjacent leg, means associated with each sliding connection to lock the leg in supporting position, and a clamp secured to the cable adjacent each leg and each connected to the adjacent brace by a pivoted link.

8. In a table, a plurality of supporting legs pivoted to the table so as to fold against it, a roller guide secured to the table adjacent each leg, a continuous flexible cable passing over the guides, a clamp secured to the cable near each leg, a guide for each clamp secured to the table, a brace pivoted to the table and having an elongated slot with a notch in one edge, a pin on each leg running in one of said slots and adapted to seat in the notch to lock the leg in supporting position, and a link connection pivoted to each clamp and the brace of the adjacent leg.

9. In a substantially rectangular table, a supporting leg pivoted thereto adjacent each corner and adapted to fold against the table, a roller guide mounted adjacent each corner, a flexible cable passing over said guides, a brace for each leg pivoted to the table inwardly of the pivotal mounting for said leg and having a longitudinal slot with a notch in one side edge thereof, a pin on each leg running in the slot of its brace and adapted to seat in the notch to lock the leg in supporting position, a clamp secured to the cable adjacent each leg, and a link connection from each clamp to the brace for the corresponding leg and connected thereto at a point spaced from its pivot to the table.

10. In a table, a plurality of supporting legs pivoted to the table so as to fold against it, a guide secured to the table adjacent each leg, a flexible cable passing over the guides, a clamp secured to the cable adjacent each leg, a guide plate secured to the table at each clamp and having an elongated slot, one or more headed studs on each clamp running in the corresponding slot, and means connecting each clamp with the adjacent leg capable of swinging the leg on its pivot by movement of the clamp.

11. In a table, a plurality of supporting legs pivoted to the table so as to fold against it, guides secured to the table, a flexible member passing over said guides, a clamp secured to the flexible member adjacent each leg, an operative connection from each clamp to the adjacent leg to cause the legs to move in unison, and a locking means associated with each connection to lock the individual legs in extended position and each controlled by said flexible connection.

12. In a table, a plurality of supporting legs pivoted to the table so as to fold against it, guides secured to the table, a flexible member passing over said guides, a link connection from said member to each leg, and separate means cooperating with each link connection to lock the individual legs in extended position and each controlled by said flexible member.

13. In a table, a plurality of supporting legs pivoted to the table so as to fold against it, guides secured to the table, a flexible member passing over said guides, a clamp secured to the flexible member adjacent each leg, a guide on the table for each clamp, an operative connection from each clamp to the adjacent leg to cause the legs to move in unison, and an individual locking means cooperating with each connection to lock the individual legs in extended position and each controlled by said flexible member.

14. In a table, a plurality of supporting legs, pivoted to the table so as to fold against it, a guide secured to the table adjacent each leg, a flexible cable passing over the guides, a clamp gripping the cable adjacent each leg and adapted to be adjusted on said cable, a guide for each clamp on the table, and means connecting each clamp with the adjacent leg capable of swinging the leg on its pivot by movement of the clamp.

In testimony whereof I affix my signature.

JOHN KOVATS.